(12) United States Patent
Robbins et al.

(10) Patent No.: US 7,248,602 B2
(45) Date of Patent: Jul. 24, 2007

(54) FLEXIBLE FILTERING

(75) Inventors: William Robbins, Bristol (GB); David Wilkins, Horfield (GB)

(73) Assignee: STMicroelectronics Limited, Bristol (GB)

( * ) Notice: Subject to any disclaimer, the term of this patent is extended or adjusted under 35 U.S.C. 154(b) by 665 days.

(21) Appl. No.: 10/421,317

(22) Filed: Apr. 22, 2003

(65) Prior Publication Data

US 2004/0004977 A1 Jan. 8, 2004

Related U.S. Application Data

(63) Continuation of application No. 09/239,881, filed on Jan. 29, 1999, now abandoned.

(30) Foreign Application Priority Data

Apr. 30, 1998 (GB) ................................. 9802094.4

(51) Int. Cl.
*H04J 3/16* (2006.01)
(52) U.S. Cl. .................... 370/465; 345/423.1
(58) Field of Classification Search ................ 370/465; 348/423.1
See application file for complete search history.

(56) References Cited

U.S. PATENT DOCUMENTS

| 5,521,979 | A | | 5/1996 | Deiss | 380/20 |
| 5,602,920 | A | | 2/1997 | Bestler et al. | 380/49 |
| 5,684,804 | A | * | 11/1997 | Baronetti et al. | 370/509 |
| 5,742,361 | A | * | 4/1998 | Nakase et al. | 348/423.1 |
| 5,864,358 | A | * | 1/1999 | Suzuki et al. | 348/731 |

(Continued)

FOREIGN PATENT DOCUMENTS

EP 0 714 213 5/1996

(Continued)

OTHER PUBLICATIONS

"ADSP-2100 Family User's Manual—Chapter 4: Data Transfer", [online][retrieved on May 21, 2003] Retrieved from Analog Devices web site using Internet <URL: http://www.analog.com/Analog_Root/static/library/dspManuals/ADSP-2100 fun books. html>.

(Continued)

*Primary Examiner*—Doris H. To
*Assistant Examiner*—Phuongchau Ba Nguyen
(74) *Attorney, Agent, or Firm*—Lisa K. Jorgenson; Timothy L. Boller; Seed IP Law Group PLLC

(57) ABSTRACT

A circuit and method for demultiplexing in a receiver a digital data stream including at least two types of data. In one particular application, such a receiver is used in a television system having a digital set-top-box receiver. A first control circuit extracts a packet identifier from an input data packet in the digital data stream, and generates a signal in dependence on whether the input data packet is of the first or second type. Sets of information associated with the first types of data packets and required by the receiver are stored in a memory under the control of a second control circuit. A third control circuit, responsive to receipt of the first type of input data packet, determines whether at least part of the input data packet matches the stored sets of information, and sets a match signal responsive thereto.

41 Claims, 8 Drawing Sheets

U.S. PATENT DOCUMENTS

| | | | |
|---|---|---|---|
| 5,920,572 A * | 7/1999 | Washington et al. | 348/476 |
| 5,935,245 A | 8/1999 | Sherer | 713/200 |
| 5,959,659 A | 9/1999 | Dokic | 348/7 |
| 6,002,694 A | 12/1999 | Yoshizawa et al. | 370/486 |
| 6,026,088 A | 2/2000 | Rostoker et al. | 370/395 |
| 6,088,357 A | 7/2000 | Anderson et al. | 370/392 |
| 6,111,896 A * | 8/2000 | Slattery et al. | 370/516 |
| 6,134,272 A | 10/2000 | Rim | 375/240.27 |
| 6,175,577 B1 * | 1/2001 | Van Den Heuvel | 348/423.1 |
| 6,185,228 B1 * | 2/2001 | Takashimizu et al. | 348/423.1 |
| 6,205,180 B1 * | 3/2001 | Dutey | 375/240.25 |
| 6,229,801 B1 | 5/2001 | Anderson et al. | 370/349 |
| 6,275,507 B1 * | 8/2001 | Anderson et al. | 370/487 |

FOREIGN PATENT DOCUMENTS

| | | |
|---|---|---|
| EP | 0 735 776 | 10/1996 |

OTHER PUBLICATIONS

Coding of Moving Pictures and Associated Audio: Systems (ISO/IEC JTC1/SC 29/WG11 N0801, Published on Nov. 13, 1994 by the ISO/IEC Copyright Office, Geneva, Switzerland).

"Design Architecture for MPEG2 Transport Demultiplexor Assist," *IBM Technical Disclosure Bulletin* 39(4):283-286, Apr. 1996, XP000587499.

* cited by examiner

FLEXIBLE FILTERING

FIELD OF THE INVENTION

The present invention relates to demultiplexing of a digital data stream including at least two types of data in a receiver, so as to retain only those parts of the digital data stream required by the receiver. The invention relates particularly but not exclusively to such a receiver circuit in a television system having a digital set-top-box receiver.

BACKGROUND OF THE INVENTION

In digital television systems, a television is provided with a set-top-box to receive and decode a broadcast digital data stream which contains programme information for display on the television. The broadcast digital data stream may arrive at the set-top-box via a satellite or cable system, via a digital terrestrial system, or via a disk or tape. A disk or tape, such as a CD ROM drive in a personal computer, may provide digital video information for display on a monitor.

There are various known standards for digital video broadcasting (DVB) and one now commonly used standard is the MPEG-2 standard.

In the MPEG-2 DVB standard data is encoded into transport packets. Each transport packet is defined by the standard as consisting of 188 bytes, comprising 4 header bytes and 184 payload bytes ("the data payload"). For transmission, the transport packets are time division multiplexed into a transport stream. At the receiver in the set-top-box, the transport stream is demultiplexed to recover the transport packets. Optionally the transport packets may be scrambled and encoded with error correction information for transmission, and then descrambled and error-checked at the receiver.

The data payload in the transport packets is, according to the MPEG-2 standard, one of two types. The first type is known as a packetised elementary stream (PES), and the second type is known as program specific information (PSI).

The packetised elementary streams (PESs) form the video, audio and private data information of the broadcast. The MPEG-2 transport stream is made up of one or more PESs (either video, audio or private). The MPEG-2 transport stream is primarily intended for the transport of TV programmes over long distances. This type of stream can combine, in the same multiplex, many programmes, each of them being composed of one or more PESs. In order that the receiver can cope with this mix of programme information, the MPEG-2 standard defines four types of tables, which together make up the MPEG-2 program specific information (PSI).

Each table of the PSI is made up of one or more sections, there being a maximum of 256 sections for each table. The MPEG-2 tables are defined in the standard, and include a program allocation table, a program map table, a conditional access table and private tables. The European DVB standard additionally defines complementary service information tables. The basic service information tables are the network information table, service description table, event information table, and time and date table. The optional service information tables are the bouquet association tables, running status tables, and stuffing tables. Each section includes an optional cyclic redundancy code (CRC) check.

A PES packet always starts at the beginning of the payload part of a transport packet and ends at the end of the transport packet. Sections, however, do not necessarily start at the beginning nor finish at the end of a transport packet. For a section, the transport packet can start with the end of another section.

At each decoder or set-top-box, the transport stream is decoded. To achieve the decoding of the transport stream, each set-top-box is provided with a transport interface, which provides an interface between the transport stream input to the box and the actual MPEG-2 decoders which decode the audio and video information and sections broadcasts.

The transport interface demultiplexes the transport stream to retain only those transport packets which are required by the particular set-top-box for decoding. The transport stream is a set of different services time division multiplexed, and the purpose of the transport interface is to demultiplex them. At a front input end of the transport interface, a time demultiplex function is performed to separate the transport stream into its component transport packets.

Each transport packet has associated therewith in its header a packet identifier (PID) which identifies the type of packet and various information associated with the data in the packets including the type of packet (PES or PSI). Each particular receiver or set-top-box is only interested in receiving packets having packet identifiers of interest to the particular set-top-box, for instance those associated with a particular television programme selected for viewing. Thus once the incoming transport stream has been time demultiplexed to recover the transport packets, it is necessary to further demultiplex the transport packets to retain only those having packet identifiers required by the receiver.

The transport interface merely uses the header of PES transport packets to demultiplex them, and stores the data payload of the demultiplexed packets in the memory. The transport interface similarly demultiplexes PSI transport packets, but then filters the sections of the demultiplexed packets to retain only sections required by the receiver, before storing the filtered sections in the memory without any further processing.

Although the MPEG-2 DVB standard is one of the main digital video broadcast standards, there are variations within the standard. It is desirable to provide receivers having decoders which are generally as flexible possible not only to cope with variations in the standard but, if necessary, to enable the receiver to be used with a different standard.

It is therefore generally desirable to provide a single receiver which provides the flexibility of enabling different types of digital video broadcast standards to be used by utilising a programmable transport interface. Utilising such a receiver in a set-top-box may enable the set-top-box to be switched between two or more types of syntax format associated with different standards in situ.

A transport interface performs, at the receiver, a number of demultiplexing operations. As stated hereinabove, initially the transport interface time de-multiplexes a received transport stream. The data packets extracted from the time demultiplexed transport stream are then demultiplexed so as to retain only those data packets required by the particular receiver. These data packets may be audio or video information (i.e. PESs) or sections (i.e. PSI). Even though a data packet containing sections is demultiplexed by the receiver to be retained, it is possible that the information provided by the section is not required by the receiver. For instance the section may be associated with a table that is not of interest to the receiver, the sections may be associated with tables that have already been processed by the receiver, the sections may be versions of tables that have already been processed, or the sections may be associated with information related to a specific set-top-box address which does not match the current set-top-box address, for example entitlement messages.

It is therefore generally desirable to provide a further level of demultiplexing in the receiver, so as to discard those sections of no interest to the receiver. In one known technique, the main processor of the receiver, after demultiplexing the transport packets identifies those which are sections and buffers the section in memory. The main processor then uses a content addressable memory (CAM) to determine whether any particular section should be retained or discarded. At least a part of the buffered section is compared with sets of information stored in the CAM. This software implementation places an additional demand on the processing power of the main processor CPU of the receiver which becomes increasingly undesirable as the tasks required to be performed by the main processor CPU of the receiver increase and become more complex.

SUMMARY OF THE INVENTION

It is therefore an object of the present invention to provide a programmable transport interface in which the demultiplexing of sections in the incoming data stream is flexible so as to enable the burden placed on the main processor of the decoder to be reduced.

According to the present invention there is provided a receiver for demultiplexing a digital data stream, the digital data stream including at least two types of data packets each having a packet identifier indicative of the type, so as to retain only those data packets required by the receiver, the receiver comprising input circuitry for receiving the digital data stream, a first control circuit for extracting a packet identifier from an input data packet in the digital data stream, and generating a first or a second type control signal in dependence on whether the input data packet is of a first or a second type, a memory for storing sets of information associated with those first types of data packet required by the receiver, a second control circuit for controlling the storage in the memory of the sets of information, a third control circuit responsive to the first type control signal in a first mode of operation for receiving at least part of the input data packet from the input circuitry and determining whether such part matches one of the stored sets of information, and for setting a match signal, wherein the third control circuit demultiplexes the input data packet responsive to the match signal.

The invention also provides a method of demultiplexing a digital data stream input to a receiver, the digital data stream including at least two types of data packets each having a packet identifier, so as to retain only those data packets required by the receiver, the method comprising the steps of inputting the digital data stream, extracting, under the control of a first control circuit, a packet identifier from an input data packet in the digital data stream, generating a first or a second type control signal in dependence on whether the input data packet is of a first or a second type, storing in a memory, under the control of a second control circuit, sets of information associated with those first types of data packet required by the receiver, in a first mode of operation responsive to the first type control signal determining, under the control of a third control circuit, whether at least part of the input data packet matches one of the stored sets of information, setting a match signal responsive to a match determined by the third control circuit and demultiplexing, under the control of the third control circuit, the input data packet responsive to the match signal.

Preferably such method further comprises the steps of in a second mode of operation determining responsive to the first type control signal, under the control of the first control circuit, whether at least part of the input data packet matches the sets of information stored in the memory, setting a match signal responsive to a match determined by the third control circuit and demultiplexing, under the control of the first control circuit, the input data packet responsive to the match signal.

BRIEF DESCRIPTION OF THE DRAWINGS

The invention will now be described with reference to the accompanying drawings, in which.

DESCRIPTION OF PREFERRED EMBODIMENT

In the following description the present invention is described with reference to an exemplary embodiment in which an MPEG-2 transport stream is demultiplexed in a programmable transport interface of a receiver in a digital set-top-box. It will be apparent, however, that the present invention is not limited to such an application and does in fact have broader applicability to other types of digital data and other types of application.

Figure 1:
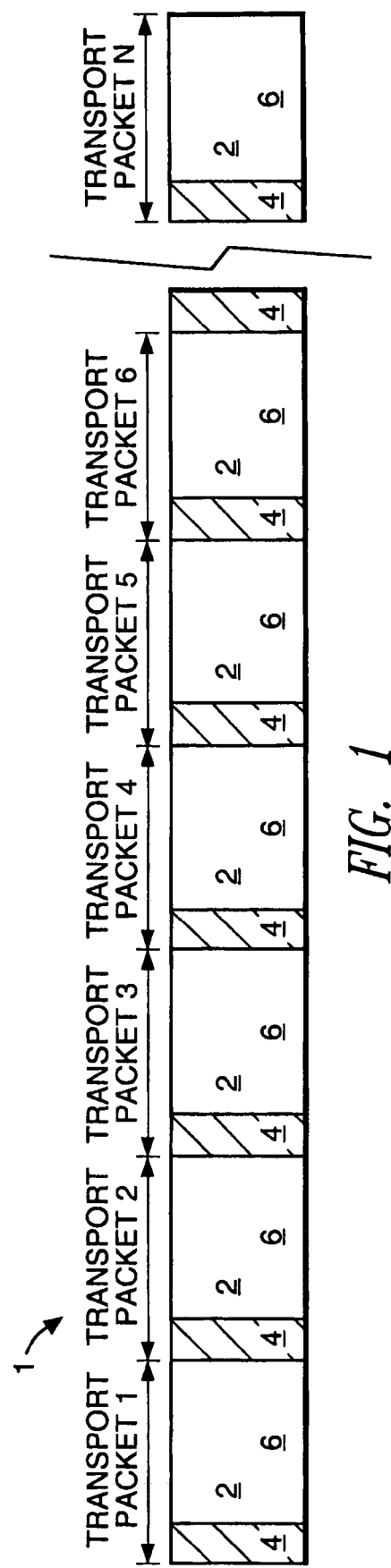
FIG. 1 illustrates a portion of a transport stream.

FIG. 1 illustrates a portion of a transport stream 1 which is composed of a series of N transport packets 2. Each transport packet 2 comprises a transport packet header 4 and a transport packet payload 6. The transport stream is a bit stream which carries in the transport packet payloads 6 information for recreating, for example, a number of different television programmes. The transport stream is formed by source encoding the television programmes. The transport stream is then typically channel encoded for transmission (by satellite or cable) and channel decoded on its reception to reproduce the transport stream. The transport stream is then source decoded to recreate a selected one of the different television programmes. Each particular television programme requires three types of information (audio information, video information and tables of programme information) for its recreation. Each transport packet 2 is preferably associated with a particular television programme, a particular source encoding time and a particular one of the information types. The individual transport packets are time division multiplexed to form the transport stream and allow the real-time recreation of any one of the different television programmes from the transport stream. To recreate a television programme the transport stream is sequentially demultiplexed to recover only the transport payloads 6 of audio information, video information and tables of programme information which are associated with the selected television programme. The recovered payloads are then decoded and used to recreate the television programme.

According to the MPEG-2 digital video broadcast (DVB) standard each of the transport packets 2 is 188 bytes long and the transport packet header 4 is 4 bytes long. The transport packet payload 6 contains either audio or video information or sections. The sections are parts of tables. The audio and video information and the sections in the payloads 6 are packetised and encoded in accordance with the MPEG-2 DVB compression standard.

Figure 2:
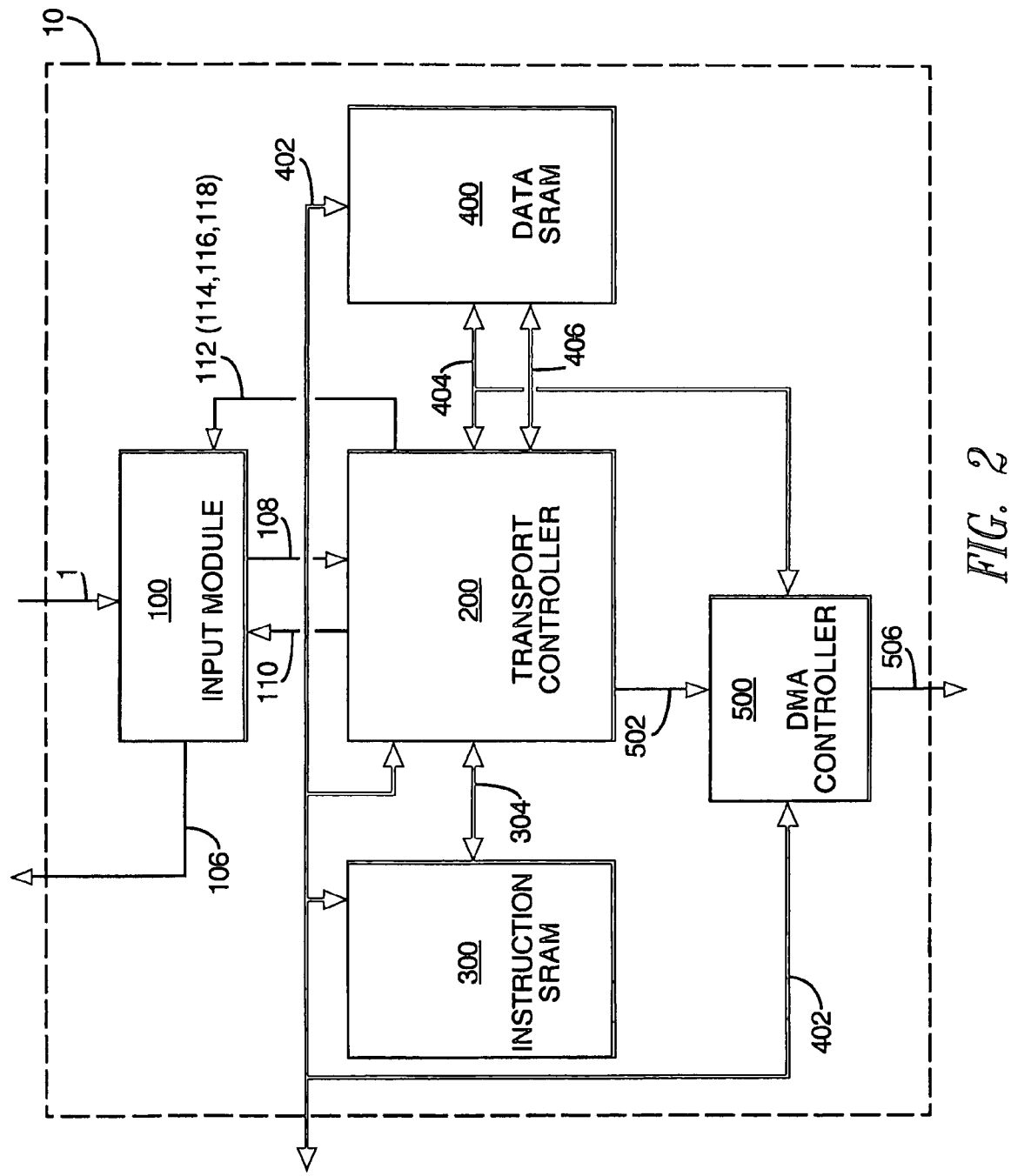
FIG. 2 illustrates in block schematic form a programmable transport interface.

A programmable transport interface 10, illustrated in FIG. 2, is used to process a transport stream 1 and produce a data output stream 506 suitable for reconstitution as a television programme after MPEG-2 decoding by MPEG-2 decoders (not shown). The programmable transport interface 10 is included in a receiver which receives the transport stream 1.

The transport packet header 4 contains a synchronisation byte which identifies the beginning of each transport packet 2. The transport packet header also contains a packet identification (PID) which identifies the information type and the television programme associated with the transport packet payload 6. The transport packet 2 also contains information identifying the source encoding time of the transport packet. The transport packet header 4, including the synchronisation byte and the PID, is not scrambled. The transport packet payload 6 may be scrambled.

The programmable transport interface (PTI) 10 performs various functions including:

i) using the synchronisation byte to identify the start of a transport packet 2;

ii) using the packet identification (PID) to identify, amongst other functions, the type of information contained in the packet (i.e. audio or video information or sections) and the television programme it represents;

iii) descrambling the transport packet payloads 6; and iv) demultiplexing the transport stream 1 to produce a data output stream 506.

The data output stream 506 comprises a stream of audio information associated with the selected television programme, a stream of video information associated with the selected television programme, or tables of programme information associated with the selected television programme. The PTI outputs these streams to the necessary MPEG-2 decoders to reproduce the selected television programme.

The programmable transport interface 10 comprises five primary functional blocks: an input module 100; a transport controller 200; an instruction SRAM (static RAM) 300; a data SRAM (static RAM) 400; and a multi-channel DMA (direct memory access) controller 500.

The input module 100 receives the transport stream 1, and outputs an alternative output stream 106. The input module 100 identifies the synchronisation byte of each transport packet which is used to synchronise the system clock and the transport stream. The input module 100 is controlled by the transport controller 200 via an input module control signal 112 which includes a descrambling control signal 114, an alternative stream control signal 116 and output stream control signals 118. The input module 100 provides bits to the transport controller 200 via an interconnect 108 and it receives bits back from the transport controller 200 via the interconnect 110. The input module, under the control of the transport controller 200 via the input module control signal 112, descrambles the payload 6 of selected transport packets 2 and supplies the selected descrambled payloads to the transport controller 200 via the interconnect 108. The descrambling of the payloads is controlled by the descrambling control signal 114 supplied by the transport controller 200 and the number and rate of bits supplied on the interconnect 108 is controlled by the output stream control signal 118. The input module 100 receives, along the interconnect 110, bits from the transport controller 200 which may be output as the alternative output stream 106 under the control of the alternative stream control signal 116.

The transport controller 200 operates on the bits received on interconnect 108 from the input module 100. The transport controller 200 receives from the input module 100 via interconnect 108 the transport packet header 4 of the transport packet 2 arriving at the transport stream input interface 102.

The transport controller 200 uses the packet identifier (PID) in the transport packet header 4 to determine whether the transport packet 2 now entering the input module 100 is associated with a selected television programme for the programmable transport interface 10. If it is not, the received transport packet 2 is discarded. If it is, it controls the input module 100 to descramble (if necessary) the transport packet payload (as described above), and to supply the transport packet payload 6 via the interconnect 108 to the transport controller 200. The transport controller 200 may further process a payload 6 associated with audio or video information for the selected programme straight to the transport controller output 502. If the payload 6 relates to a section of a table the transport controller 200 may process the information before providing it at its output 502. Alternatively the transport controller 200 may process the received payloads 6 and repacketise them in accordance with a different transmission standard. The reformatted transport stream is then provided to the input module 100 via the interconnect 110 and it is output as the alternative output stream 106 under the control of the alternative stream control signal 116.

The transport controller 200 comprises a transport processor (not shown) which reads instruction sets from the instruction SRAM 300. The transport controller 200 is connected to the SRAM 300 by interconnect 304 and it reads its instructions via the interconnect 304. A system processor (not shown) may read and write to the instruction SRAM 300 via a system interconnect bus 402. However, the transport controller 200 has preferential access to the instruction SRAM 300 determined by an arbiter (not shown) which arbitrates between accesses by the transport controller 200 and the system processor. The system processor may also access the transport controller 200 via the system interconnect bus 402.

The data SRAM 400 can be accessed by the processor of the transport controller 200 via the interconnections 404 and 406. The processor of the transport controller uses the interconnection 404 to read from and write to the data SRAM 400. A search engine within the transport controller 200 reads from the data SRAM 400 along interconnection 406. The search engine searches the data SRAM 400 for the packet identifiers (PID) in the incoming transport packet header 4. If the packet is not to be discarded, then the PID for that packet will have been stored in the data SRAM, and is located by the search engine of the transport controller. Associated with each PID in the data SRAM is a plurality of pointers, which point to other addresses in the data SRAM where other information associated with the incoming transport packet is stored. The search engine retrieves the pointers stored with a particular PID for use by the transport controller processor. The transport controller processor then uses the pointers to access all the information it needs to process the payload of the incoming transport packet. The pointers may, for example: point to descrambling keys for use by the input module 100; point to addresses for use by the DMA controller 500; identify whether the payload is video or audio information or sections, identify whether the payload is special data to be output on alternative output stream 106; or locate information for masking the search filter etc. A detailed description of the operation of the search engine of the transport controller 200 in reading the data SRAM is given in co-pending U.S. patent application Ser. No. 09/239,907, filed Jan. 29, 1999.

Thus, this information enables the transport controller to generate the input module control signals 112 as appropriate, and control the processing, if any, of the bits received on interconnect 108.

The transport controller 200 produces a transport controller output 502 which is supplied to the multi-channel DMA controller 500. The multi-channel DMA controller 500 supplies the data output stream 506, indirectly, to the MPEG-2 decoders (not shown). A full description of the DMA controller 500 can be found in co-pending U.S. patent application Ser. No. 09/240,176, filed Jan. 29, 1999.

The system processor writes to each of the instruction SRAM 300, the transport controller 200 and the data SRAM 400 via the system interconnect bus 402. The instruction SRAM 300 can only be written to by the system processor: the transport controller can only read from, and not write to, its own instruction SRAM 300 via the interface 304. The system processor can also read from the instruction SRAM. An arbiter is provided to arbitrate between accesses to the instructions SRAM 300 by both the system processor and the transport controller 200.

The system processor, via the system interconnect bus 402, and the transport controller 200 via interface bus 404, can both read and write to the data SRAM 400. The search engine of the transport controller 200 can only read from the data SRAM 400 via interface bus 406. An arbiter is provided to arbitrate accesses to the data SRAM 400 by each of the system processor, the transport controller 200, and the search engine within the transport controller 200. Access to the data SRAM 400 is arbitrated with the following order of priority: the search engine within the transport controller 200 has highest priority, the transport controller processor next priority, and the system processor lowest priority. The system processor is given two consecutive accesses each time an access is granted. The transport controller may be reset by the system processor by a reset signal on the interface bus 302.

The system processor, via system interconnect bus 402, and the transport controller 200 via the bus 404, can both read and write to registers within the DMA controller 500. An arbiter is provided to arbitrate between the system processor and transport controller access to the DMA controller.

The system processor via system interconnect bus 402 also accesses registers within the transport controller 200, to read and write thereto.

The system processor initially writes to the instruction SRAM 300, the data SRAM 400, and registers within the transport controller 200 and the DMA controller 500, to configure them.

Figure 3:
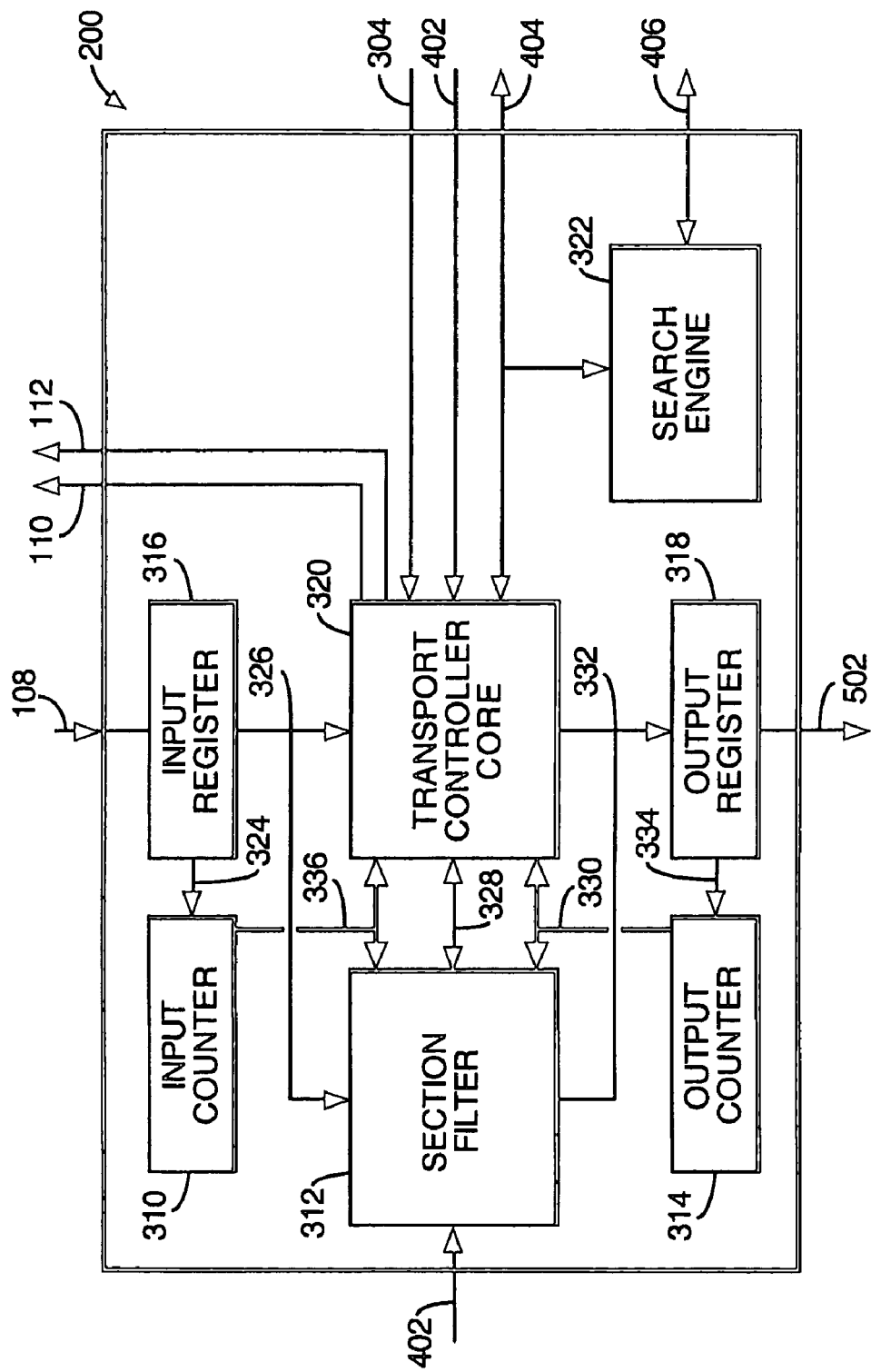
FIG. 3 is a block diagram of the transport controller of the programmable transport interface according to a preferred implementation of the present invention.

Referring now to FIG. 3, there is shown a block diagram of the main components of the transport controller 200 of the programmable transport interface 10.

The main elements of the transport controller 200 are a transport controller core 320, a section filter 312, an input register 316, an output register 318, an input counter 310, an output counter 314, and a search engine 322.

The input register 316 receives the bits on the interconnect 108 and outputs them on lines 326 to both the transport controller core 320 and the section filter 312. The input register 316 also provides an input on line 324 to the input counter 310, and in turn the input counter 310 provides an input on line 336 to the transport controller core 320 and the section filter 312. The transport controller core 320 has bi-directional connections 328 to the section filter 312. In addition, and as described hereinabove with reference to FIG. 2, the transport controller core 320 is connected to the instruction SRAM via the interconnect 304, and is connected to the system processor via the system interconnect bus 402. The transport controller core also accesses the data SRAM 400 via interconnections 404, the interconnections 404 also being connected to the search engine 322. The search engine 322 accesses the data SRAM 400 via the interconnections 406. The transport controller core provides an output on lines 332 which form an input to the output register 318, the output register 318 providing the output signals on interconnect 502. The output register 318 also provides a signal on line 334 which provides an input to the output counter 314, the output counter 314 in turn providing an output on signal line 330 to the transport controller core 320 and the section filter 312. The section filter 312 also has an output connected to the line 332 to form an input to the output register 318. The section filter can be accessed by the system processor via the system interconnect bus 402. The transport controller core 320 also outputs the signals 112 and the signal 110 directly to the input module 100.

Referring to FIG. 3, the transport controller core 320 receives the transport header of the transport packet, and the PID contained therein is used to demultiplex the incoming transport stream and access information associated with that PID contained in the data SRAM 400. The transport controller core 320 supplies the PID of the incoming transport header to the search engine 322, and the search engine 322 communicates with the data SRAM 400 via the bus 406 to search the data SRAM for the given PID. If the PID is not present in the data SRAM, then the transport controller core 320 discards the transport packet. If the PID is present in the data SRAM, then the transport controller core 320 accesses an address in the data SRAM 400 identified by the search engine 322 and obtains parameters associated with that PID therefrom. A fuller description of the search engine 322 and its operation can be found in co-pending U.S. patent application Ser. No. 09/239,907, filed Jan. 29, 1999.

The information accessed from the data SRAM in dependence on the PID will, amongst other parameters, identify whether the transport packet includes a section or whether it includes audio or video information. The present invention is concerned with and therefore for the following description it will be assumed that the PID successfully identified by the search engine 322 is associated with a section, and thus the incoming transport packet contains a section.

If the incoming transport packet contains a section, then this section needs to be filtered to determine whether it is a section for use by the selected television programme which should be output by the transport controller on the interface 502. The specific operation of the section filter as shown in FIG. 3 is described hereinafter.

Figure 4:
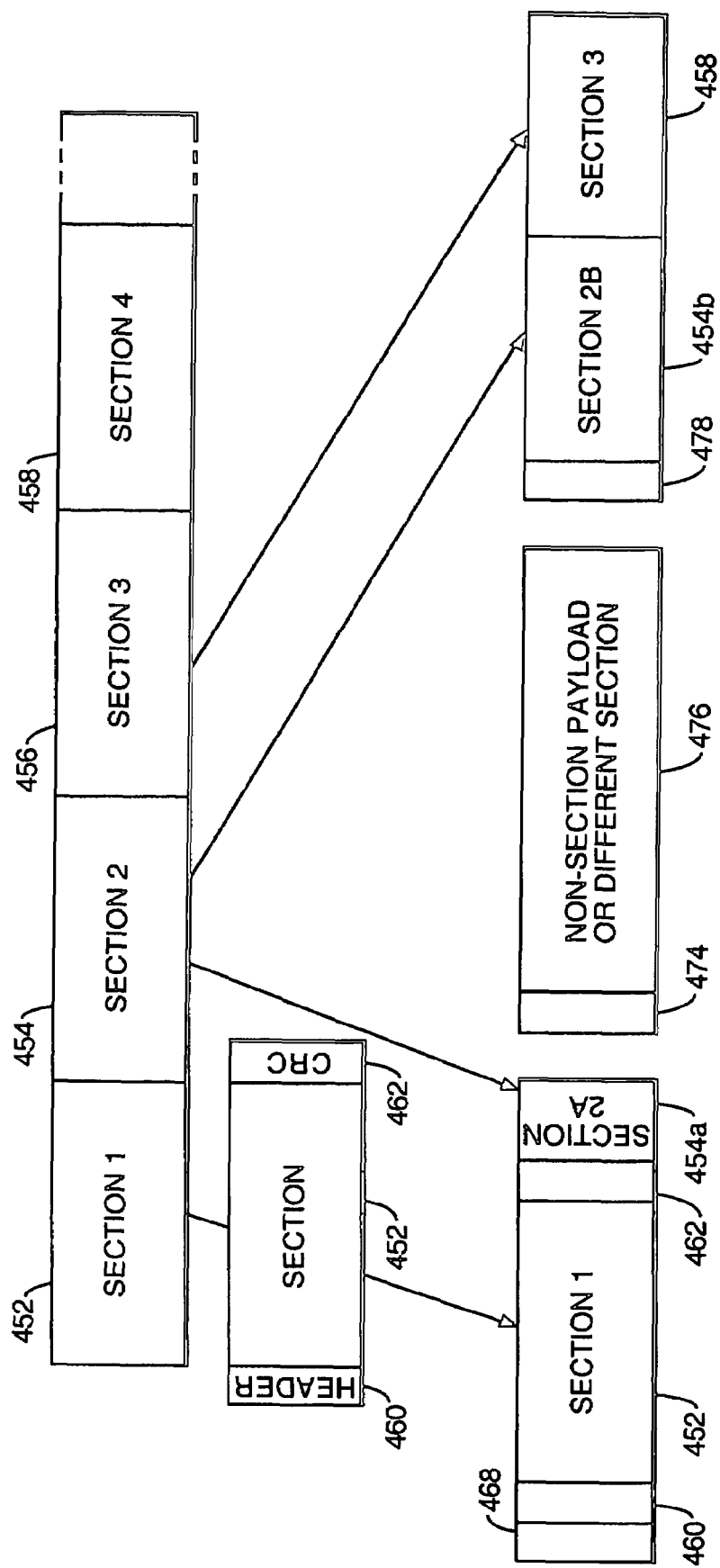
FIG. 4 illustrates the transport of sections in a MPEG-2 transport stream.

Referring to FIG. 4(*a*), there is shown a table comprising a plurality of sections 452 to 458, Section 1 to Section 4, prior to encoding for digital transmission. The table may comprise a much larger number of sections. For transmission in the transport stream, each section 452 to 458 is modified as shown in FIG. 4(*b*). FIG. 4(*b*) shows Section 1, 452, modifed to include a header 460 and a cyclic redundancy code (CRC) checksum 462. After encoding as shown in FIG. 4(b), each section of the table is multiplexed into the transport stream. The sections do not usually fit exactly into transport packets, but are broken across transport packet boundaries into split sections.

It should be noted that the cyclic redundancy code check on the sections is optional.

Referring to FIG. 4(c), there is shown an example of a transport stream. A first transport packet comprises a packet header 468, and Section 1 450 having section header 460 and section CRC 462. The first transport packet additionally includes a first part of Section 2, 454a. The next transport packet of the transport stream includes a transport packet header 474 and a transport packet payload 476. However the payload 476 of the second transport packet is a non-section payload i.e. video or audio information. Alternatively, the payload 476 may include sections associated with a different table other than that of FIG. 4(a). Thereafter a third transport packet in the transport stream having a packet header 478 includes the second part of Section 2, 452b of the table of FIG. 4(a), and Section 3, 454 of the table of FIG. 4(a).

For the purposes of illustration in FIG. 4(c) the first and third transport packets are shown transporting the second and third section of the table without any cyclic redundancy code check.

The detailed description hereinbelow of the section filter block of the transport controller of FIG. 3 will describe how the section filter keeps track of section information when the section is split amongst transport packets.

The transport stream received at the input module 100 is that shown in FIG. 4(c). The PID of each transport packet is passed to the transport controller core 320, and for a packet having a valid PID and a section contained therein, the transport controller core 320 will access information from the data SRAM indicating that the payload is a section. Thus the transport controller core 320 controls at least the start of section filtering of the section in the incoming transport packet.

Section filtering is preferably applied over a fixed or variable number of bytes at the start of a section. Multiple filters can be applied to one section or multiple sections applied to one filter or a set of filters. The PID, used by the transport controller core 320 to access information associated therewith, determines the type of filtering to be done on the section in accordance with control information stored in the data SRAM 400. In general, any bit of the section filter is normally a match value or a "don't care" value (i.e. always matches). Some other options may also be useful, for example the option to pass the section through the section filter even when the section filter does not detect a match.

The main purpose of section filtering is data-rate reduction, and specifically to reject information that is not of interest for further processing. In this way, the load on the main processor is reduced. Sections might be rejected by the section filter because they are associated with tables that are not of interest, the sections may be associated with tables that have already been processed, they may be versions of tables that have already been processed, or they may be associated with information related to a specific set-top-box address which does not match the current set-top-box address, for example entitlement messages.

The section filter operation provided by the transport controller 200 according to the present invention has two modes of operation: an automatic mode; and a manual mode. In addition, the transport controller may operate in a further manual mode independent of the section filters. Referring to FIG. 5, there is shown a series of block schematics which illustrate in general form each of the three modes of operation. It is beneficial to refer to the general block diagram of FIG. 5 to appreciate an overview of each mode of operation before describing the operation of the section filter according to this invention in detail.

Figure 5A:
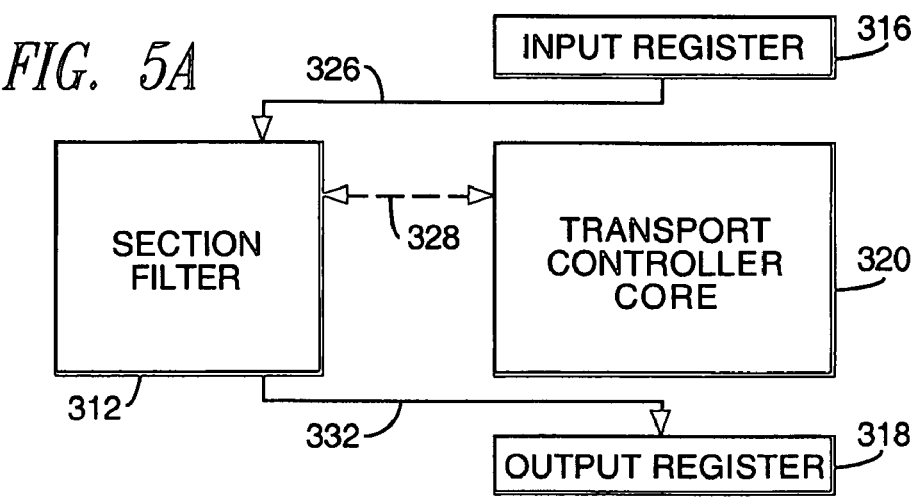
FIG. 5 illustrates schematically the operation of the section filter of the present invention.

FIG. 5(a) illustrates the automatic mode of the section filter. In automatic mode, the transport controller core 320 is bypassed once registers within the section filter 312 have been set up via the bus 328. Thus the sections are passed directly to the section filter through the input register 316 via line 326, and the output of the filtered section are passed directly to the output register 318 via lines 332.

Figure 5B:
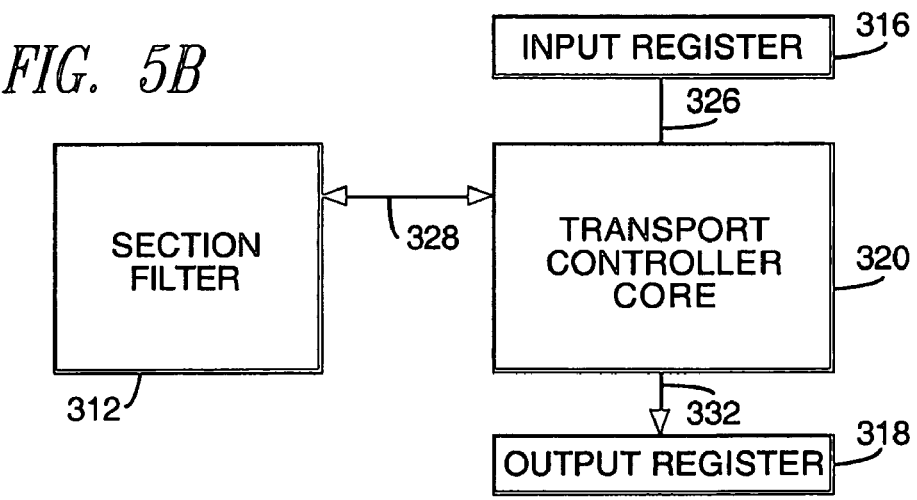

The manual mode of the section filter is illustrated in FIG. 5(b). In manual mode, the sections are transferred directly into the transport controller core 320 from the input register 316 via lines 326. Similarly, the output of the transport controller core 320 is passed directly to the output register 318 via lines 332. The manual mode of operation still employs certain elements of the section filter 312 via the bus connection 328 as will be described in further detail hereinafter.

Figure 5C:
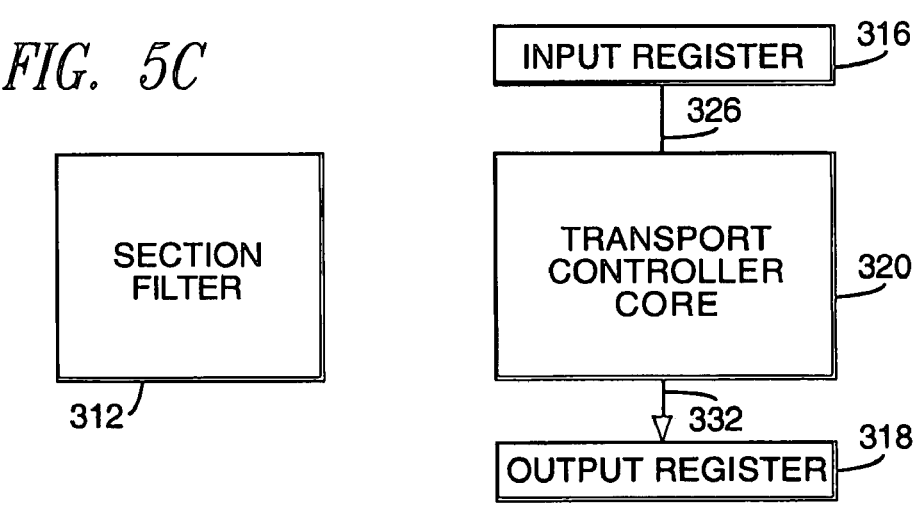

FIG. 5(c) shows the manual mode of the transport controller which operates completely independently of the section filter 312. In this mode the transport controller core 320 filters the sections itself. The sections are still fed directly into the transport controller core 320 via lines 326, and fed directly out of the transport controller core 320 via lines 332.

Automatic mode, using the section filter, can be used for the high speed ISO compliant transport packets while fully reprogramable software can be run on the transport controller in full manual mode. In the manual mode, the transport controller reads the section and filters them either purely in software (full manual mode) or passes them to the hardware of the section filter and its hardware match logic. The three options provided by the automatic mode, and the two manual modes provides a highly flexible filtering arrangement giving a good trade-off between speed and flexibility.

Figure 6:
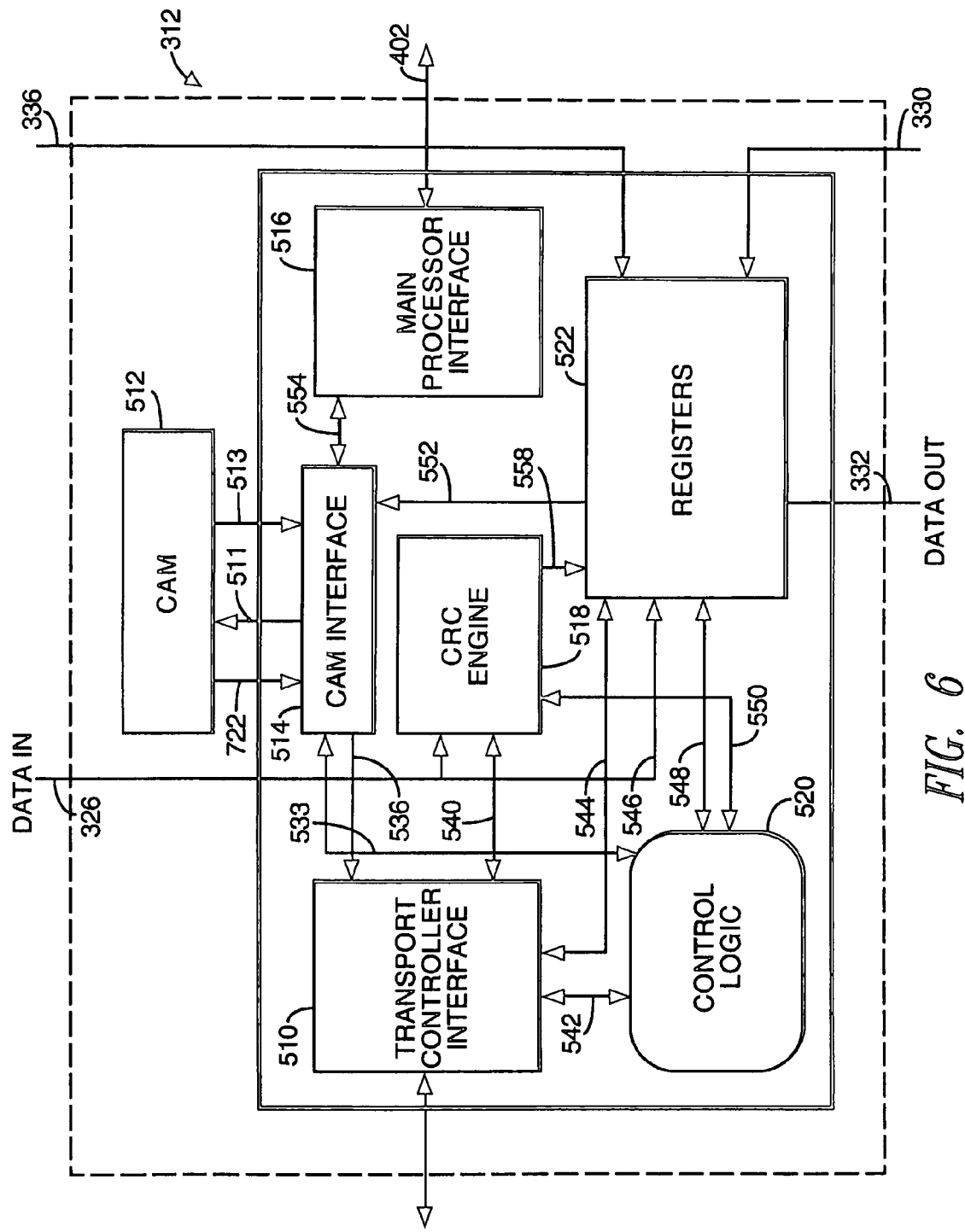
FIGS. 6 and 7 illustrate a block diagram of a preferred implementation of a section filter according to the present invention.

Turning now to FIG. 6, the operation of the section filter 312 will be described in detail. The section filter 312 includes a content addressable memory (CAM) 512, a CAM interface 514, a transport controller interface 510, a main processor interface 516, a CRC engine 518, control logic 520, and registers 522.

The CAM interface 514 applies inputs to the CAM 512 on signal lines 511, and receives outputs from the CAM 512 on signal lines 513. The CAM interface provides an interface to the CAM 512 for the transport controller core 320, the main processor, and the control logic 520 and registers 522 of the section filter 312. The main processor interface 516 is connected to the main processor interconnect bus 402, and to the CAM interface 514 via interconnects 554. The transport controller interface 510 is connected to the transport controller interconnects 328, and receives signals from the CAM interface 514 on lines 536, and is interconnected to both the control logic 520 and CRC engine 518 respectively of the section filter 312 by interconnects 542 and 540. The control logic 520 is connected to the CAM interface 514 via bi-directional signal lines 538. The control logic is additionally connected to the CRC engine 518 via bi-directional signal lines 550, and the registers 522 via bi-directional signal lines 548. The registers 522 are connected to the CAM interface 514 via bi-directional signal lines 552. The input signals DATAIN on lines 326 form inputs to the CRC engine 518 and the registers 522. The registers 522 output the output data DATOUT on lines 332. Additionally, the registers 522 receive the contents of the input counter 310 on lines 336 and the contents of the output counter 314 on lines 330. The CRC engine outputs a signal on line 558 to the registers 522.

Figure 7:
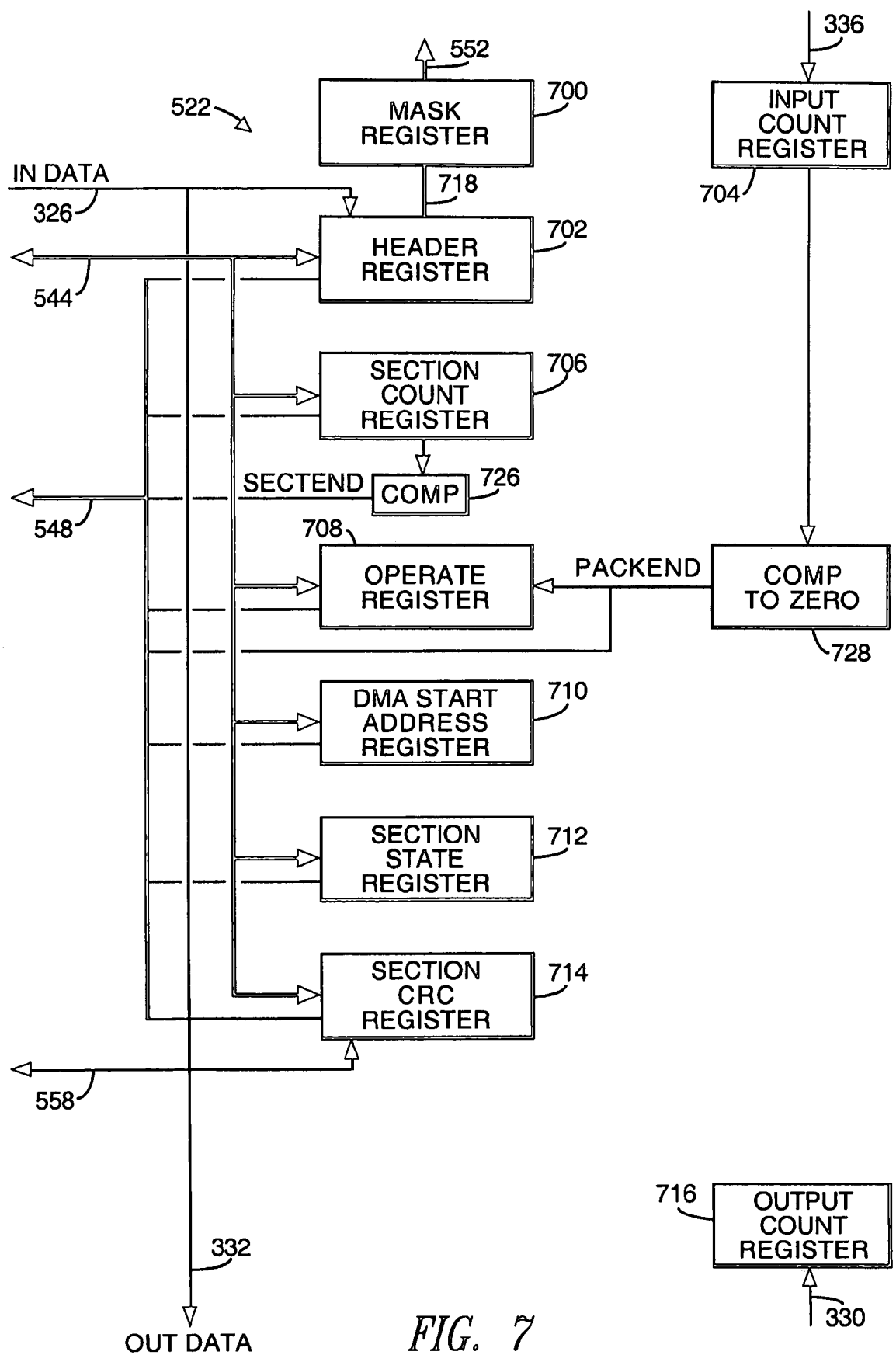

Turning now to FIG. 7, the registers 522 included in the section filter 312 are exemplified in more detail. The registers 522 of the section filter 312 include a header register 702, a mask register 700, a section count register 706, an operate register 708, a DMA start address register 710, a section state register 712, a section CRC register 714, an input count register 704, and an output count .register 716. The registers 522 additionally include two comparator circuits 726 and 728.

Each of the header register 702, section count register 706, DMA start address register 710, section state register 712 and section CRC register 714 are connected through the bi-directional signal lines 544 to the transport controller interface 510. This enables the transport controller interface 510 to access these registers as will be described hereinbelow with reference to specific examples. The mask register 700 provides the output 552 to the CAM interface 514. The input to the mask register 700 is provided on lines 718 by the header register 702. The header register 702 receives as an input the input data DATAIN on lines 326, as well as control signals on lines 548 from the control logic 520. In addition, the header register 702 provides an output on line 720 to the section count register 706. The section count register 706 itself receives signals on line 548 from the control logic 520.

The operate register 708 receives control signals on line 548 from the control logic 520, as does each of the DMA start address register 710, the section state register 712, and the section CRC register 714. The section CRC register 714 additionally receives signals on line 558 from the CRC engine 518.

The operation of the section filter 312 will now be described with reference to both of FIGS. 6 and 7 using specific examples.

A first example will be described for operation of the section filter in automatic mode. The automatic mode provides high speed fixed syntax filtering. Referring back to FIG. 4(c), the transport stream illustrated therein arrives at the input module of the transport interface, the first transport packet of which includes a first section of a table. As has been described hereinabove, the PID of the incoming transport packet is used by the transport controller core to access information associated with such PID stored in the data SRAM. The information retrieved from the data SRAM will indicate that the transport packet associated with such PID includes section information. The transport controller core thus, in automatic mode, connects the output of the input register 316 directly to the input of the section filter 312. In doing so the transport controller core 320 requests the remainder of the payload of the incoming transport packet by setting one of the signals on line 112 to the input module 100.

Prior to transferring the data payload of the transport packet to the section filter 312, there will be a request/grant handshake protocol between the section filter 312 and the input module 100. It will be readily apparent to a person skilled in the art how such request/grant protocol could be implemented, and therefore as such is not directly related to the present invention there will be no detailed discussion herein.

In such automatic mode, the transport controller core 320 additionally sets the operate register 708 in the registers 522 via the transport controller interface 510 of the section filter 312. The operate registers 708 may have one of three states, namely: an inactive state indicating that the section filter is inoperative; a first active state indicating that the section filter is operating in automatic mode; and a second active state indicating that the section filter is operating in manual mode. In this first example, the operate register 708 is set by the transport controller core 320 to indicate an active automatic mode.

After the setting of the operate register 708, the header of the section in the incoming transport packet is loaded into the header register 702 via the data input signal line DATAIN 326 under the control of the control logic via signal lines 548. The number of bytes in a header of a section may vary according to applications, and furthermore in some applications it may not be necessary to load the whole header into the header register 702. When the appropriate bytes of the header of the section of the incoming packet have been loaded into the header register 702, the value contained therein is output onto the signal lines 718 and applied to the mask register 700. The optional mask register 700 is pre-configured as a filter enable according to the DVB standard being used. The filter enable mask serves to mask certain bits of the bytes stored in the header register 702 such that these bits are not enabled. The masked output of the header register 702 is then applied to the signal lines 552 and applied to the CAM interface 514. The CAM interface 514 applies this masked value of the header via signal lines 511 to the CAM 512 to search for a match. The results of the CAM operation are output by the CAM 512 on a hit signal line 722 which is input to the CAM interface 514. If the CAM 512 finds a match of the masked header value then the hit signal on line 722 is set. Otherwise the hit signal on line 722 is not set.

The CAM interface 514 outputs the result of the CAM operation on signal lines 538 to the control logic 520. The control logic 520 then loads a value in the section state register 712 via control lines 548 to indicate whether the result of the CAM operation found a match. Thus the section state register 712 is indicative of whether the incoming section should be retained by passing through to the output and transferred to the DMA controller, or whether it should be discarded.

If the result of the CAM operation is a match, then the data payload of the section included in the incoming transport packet should be transferred to the output of the section filter 332 for transfer via the output register 318 to the output 502 without any further processing. Again, the section filter will implement a request/grant handshake protocol with the output register 318 before outputting the data payload of the section. Such protocol will be well understood by one skilled in the art and is not described in detail herein.

At the same time as the transport controller core 302 accesses the data SRAM 400 using the PID of the incoming transport packet, and requests the remainder of the payload of the incoming transport packet from the input module 100, the transport controller core 320 communicates via interconnects 328 with the section filter 312 to configure the DMA start address register 710. The transport controller core 320 writes into the DMA start address register 710 the first address location of where the section in the data payload should be written to by the DMA controller if the section is to be retained.

If the result of the CAM operation is a match, then the control logic 520 controls the header register 702 and the section count register 706 via signal lines 548 to load into the section count register 706 from the header register 702 via line 720 the appropriate byte of the header register 702 which indicates the length of the section. This length may be identified preferably by the number of bytes included therein. Thus the section count register 706 identifies the number of bytes of the section which are to be transferred to the DMA controller.

On every data payload section which is, following the transport controller core 320 accessing the appropriate PID in the data SRAM, to be transferred to the output 502 whether via the section filter or otherwise, the input counter 310 counts down the incoming transport packet as it passes through the input register 316. The input counter 310 is loaded with the value of the number of, for example, bytes in the incoming transport packet. Every byte which passes through the input register 316 then results in a decrement of the value stored in the input counter 310 by one value. Thus when the value of the input counter 310 reaches zero, the transport controller core 320 identifies such by monitoring the value on line 336 and thus identifies the end of a transport packet. The input count register 704 in the section filter 312 is connected directly to the output 336 of the input counter 310, and merely mirrors the contents thereof. Thus the input count register 704 provides the section filter 312 with a register so that it itself may monitor the value of the input count to detect the end of a transport packet. The output count register 314 is an upward counter which counts the data payload as it is output through the output register 318. Thus the output counter 314 provides an indication of the DMA address to which the current output byte of the data payload is to be stored relative to a base start address. Thus the output counter 314 is indicative of the off-set from the DMA start address to where the current data is to be stored. The output counter 716 of the section filter 312 receives the contents of the output counter 314 on lines 330 and is thus a mirror of the content thereof.

The section comprising the data payload of the transport packet is thus output through the output register 318 to the DMA controller. For each byte of the section which is output, the control logic 548 controls the value in the section count register 706 to be decremented by one value, i.e. in the preferable embodiment by one byte. When the value in the section count register 706 reaches zero, then the section has been successfully parsed and the section filter can cease operation. The comparator 726 monitors the value of the section count register 706 provided thereto on a line 730. When the comparator 726 identifies that the value in the section count register 706 is equal to zero, it sets its output SECTEND on line 732. The signal SECTEND forms an input to the control logic 520 via signal lines 548. The comparator circuit 728 receives via signal line 736 the value in the input count register 704. As with the comparator 726, the comparator 728 compares the current value of the input count register 704 to see whether it has reached zero. In the event that the value in the output count register 704 reaches zero then the comparator 728 sets the signal PACKEND on line 734 to indicate that the packet has ended. This signal PACKEND on line 734 is output to the control logic 520 via lines 548.

In response to the signal SECTEND on line 732 from the comparator 726, the control logic 548 will check the current status of the signal PACKEND on line 734. In the event that the signal PACKEND is not set, indicating that the packet is not ended, then the control logic will load the next set of bytes entering into the section filter 312 on lines 326 into the header register 702 under the control of the signals 548, since these bytes will be the header bytes of a second section of the table. The operation described hereinabove for comparing the header bytes in the CAM 512 will be repeated, and in the event that a successful match is found the bytes of this section pass through the DMA controller.

When the end of the incoming packet is reached, the value in the input counter 704 will reach zero and the comparator 728 will send the signal PACKEND on line 734. In response to the signal PACKEND on line 734, the control logic 520 will reset the operate register 708 to indicate an inactive state. Furthermore, the transport controller core 320 itself monitors the state of the operate register 708, and in response to the inactive state being set will identify the end of the section filter operation. In response to the end of the section filter operation, the transport controller core will access the contents of certain registers in the section filter 312 and restore them in the data SRAM with the appropriate PID.

The transport controller core 320 accesses the contents of the header register 702, section count register 706, DMA start address register 710, section state register 712, and section CRC register 714 of the section filter 312 via signal connections 544 of the section filter 312 and stores them in the data SRAM 400 in the data area associated with the PID of the transport packet which has just been parsed. Thus, when a further transport packet arrives, which has the same PID and the continuing section information associated with the first transport packet, the transport controller core 320 can reload the values of all these registers into the section filter 312 and the section filter 312 can recommence parsing of the appropriate section.

The section filter 312 also preferably provides for error detection by provision of the CRC engine 518. The CRC engine calculates the CRC of the transport packet being parsed including sections as it receives the transport packet on line 326. The CRC engine 518 keeps the current value of the CRC check stored in the section CRC register 714 of the register 522 which it accesses via signal lines 558. When the control logic 520 detects the end of a packet by detecting the signal PACKEND on line 734 being set, it sends a control signal on line 550 to the CRC engine 518 to perform a check of the CRC of the received transport packet. The CRC engine 518 performs this check merely by comparing the CRC value it had itself calculated and stored in the section CRC register 714 with the CRC check sum appended to the received section. If the CRC engine detects an error, then it signals such to the control logic 520 via signals 550.

The manual mode of operation of the section filter 312 will now be described. In a first manual mode of operation, as before the transport controller core 320 uses the PID of the incoming transport packet to access information associated with such PID in the data SRAM 400.

In the first manual mode of operation, the transport controller core 320 utilises the CRC engine 518 and CAM 512 of the section filter 312 to perform section filtering, but the data payload of the incoming transport packet is transferred from the input register 316 into the transport controller core 320 and not through the section filter 312, and any successfully filtered data payload is transferred from the transport controller core 320 directly to the output register 318. The principal of operation of the CRC engine and the comparison with the CAM 512 are the same in manual mode as in automatic mode. Thus manual mode allows software operation of both the CRC engine 518 and the CAM 512.

When the first manual mode is utilised, the header register 702 is loaded directly by the transport controller core 320 and applied to the CAM 512 via the mask register 700 as described hereinabove with reference to the automatic mode. The operate register 708 is set to its second active state by the transport controller core 320 in manual mode via the transport controller interface 510.

In both the first manual mode and automatic mode, the contents of the CAM 512 are configured by the main processor, and may be reconfigured by the main processor at any time to provide section filtering flexibility.

In a second manual mode of operation the transport controller operates completely independently of the section filter as exemplified hereinabove with reference to FIG. 5(*c*). This is a "software" mode of operation which is fully reprogrammable but slower in operation.

Figure 8:
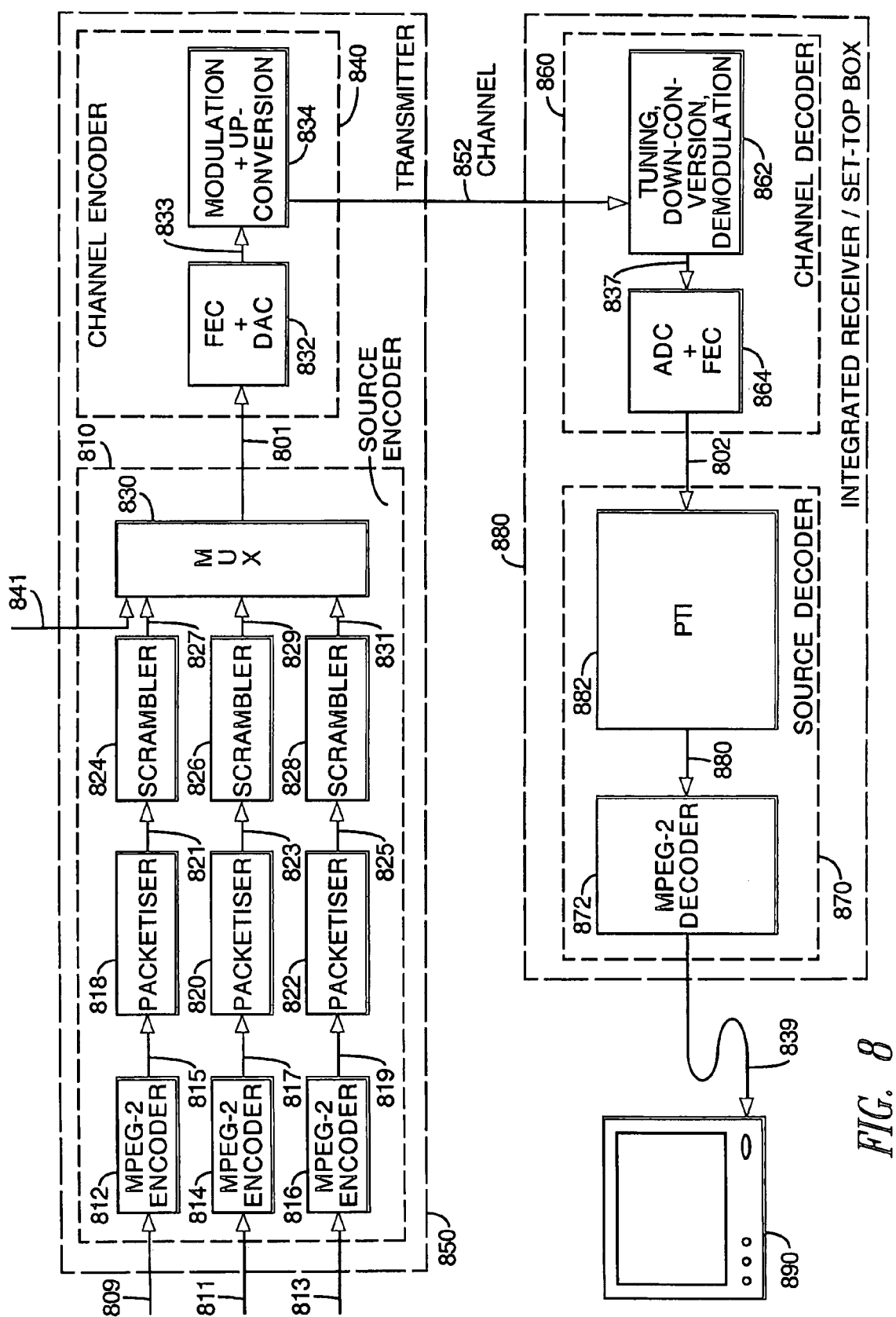
FIG. 8 illustrates a digital video broadcast system incorporating a programmable transport interface according to the present invention.

FIG. 8 illustrates an application of a programmable transport interface, according to the present invention, in a digital television system.

FIG. 8 illustrates how digital television signals 809, 811, and 813 can be transmitted via a cable, satellite or terrestrial television channel 852 and be viewed on a television 890. The first, second and third television signals 809, 811 and 813 each represent the audio and video signals necessary to recreate a television program on input to a television. The digital television signals 809, 811 and 813 are source encoded and channel encoded by a transmitter 850 to produce a modulated analogue signal for transmission on the channel 852. An integrated receiver decoder (also known as a set-top-box) 880 receives the modulated analogue signal from the channel 852 and produces a video signal 839 which operates the television 890.

The operation of the transmitter 850 will now be explained. The transmitter includes a source encoder 810 and a channel encoder 840. The source encoder includes— first, second and third MPEG-2 encoders 812, 814 and 816; first second and third packetisers 818, 820 and 822; first, second and third scramblers 824, 826 and 828 and a multiplexer 830. The first, second and third MPEG-2 encoders respectively receive the first 809, second 811 and third 813 television signals and encode the signals to produce first, second and third elementary bit streams 815, 817 and 819. The first 818, second 820 and third 822 packetisers respectively receive the first 815, second 817 and third 819 elementary bit streams and packetise the elementary bit streams to produce first, second and third packetised elementary bit streams (PES) 821, 823 and 825. The packetising of an elementary bit stream includes creating a series of packets which contain a packet header and a data portion, but which do not have any fixed length. The first 824, second 826 and third 828 scramblers receive respectively the first 821, second 823 and third 825 packetised elementary bit streams (PES) and produce first, second, and third scrambled PES 827, 829 and 831. Each of the scramblers scrambles only the data portion of each packetised elementary bit stream it receives and does not scramble the packet header.

The multiplexer 830 receives as inputs packetised sections of tables on line 841, and the first, second and third scrambled PES 827, 829 and 831, and produces a transport stream from one of its inputs on line 801. The packetised sections of tables 841 contain information which allows the set-top-box 880 to effect source decoding and produce the video signals 839. The information is stored in a tabular format where each table contains a number of sections and each section is transmitted individually.

The multiplexer 830 produces a transport stream 801 such as that illustrated in FIG. 1 as discussed in detail hereinabove. The transport stream includes a number of transport packets 2 wherein each transport packet contains a transport packet header 4 and a transport packet payload 6. The transport packets have a fixed length. In the MPEG-2 digital video broadcast (DVB) standard the transport packet is 188 bytes in length. The transport packets are shorter in length than the packets in the packetised elementary stream (PES). Consequently, a packet from the first scrambled PES 827 will be spread over a number of transport packets and these transport packets will be multiplexed with transport packets derived from the packetised sections of tables 841 and the second and third scrambled PES 829, 831. The transport stream is then supplied on line 801 to the channel encoder 840 to produce the modulated analogue signal for transmission on the channel 852.

The channel encoder 840 includes circuitry 832 for forward error correcting (FEC) the transport stream on line 801 and a digital-to-analogue converter (DAC) for converting the signal from digital to analogue to produce an analogue signal 833. The analogue signal 833 is modulated and up-converted to a transmission frequency by the circuit 834 to produce the modulated analogue signal which is then transmitted into the channel 852.

The operation of the set-top-box 880 will now be explained. The set-top-box 880 includes a channel decoder 860 and a source decoder 870. The channel decoder 860 receives the modulated analogue signal on the channel 852 and produces the transport stream 802 which it supplies to the source decoder 870.

The channel decoder 860 includes circuitry 862 for tuning to the modulated analogue signal on the channel 852, and for down-converting and demodulating the modulated analogue signal on the channel 852 to produce an analogue signal 837. The analogue signal 837 is converted from analogue to digital in an analogue to digital converter (ADC) and forward error corrected (FEC) by the circuitry 864 to reproduce the transport stream as signal 802.

The source decoder 870 receives the transport stream 801 and produces the video signal 839. The source decoder 870 includes a programmable transport interface (PTI) 882 and MPEG-2 decoder 872. The PTI 960 demultiplexes the transport stream 802, selects the transport packets 2 carrying information relating to a particular television program, and descrambles these selected transport packets to produce a data output stream 880, which is, in fact, the packetised elementary bit stream associated with the selected television program. The MPEG-2 decoder 872 receives the data output stream 880 and produces the video signal 839 which is supplied to the television 890. The television 890 displays the selected television program.

The invention claimed is:

1. A receiver for demultiplexing a digital data stream, the digital data stream including at least two types of data packets each having a packet identifier indicative of the type, so as to retain only those data packets required by the receiver, the receiver comprising:

input circuitry for receiving the digital data stream;

a first control circuit for extracting a packet identifier from an input data packet in the digital data stream, and generating a first or a second type control signal in dependence on whether the input data packet is of a first or a second type;

a memory for storing sets of information associated with those first types of data packet required by the receiver;

a second control circuit for controlling the storage in the memory of the sets of information; and a third control circuit responsive to the first type control signal in a first mode of operation for directly receiving at least part of the input data packet from the input circuitry and determining whether such part matches one of the stored sets of information, and for setting a match signal, wherein the third control circuit demultiplexes the input data packet responsive to the match signal, wherein in a second mode of operation the first control circuit, responsive to the first type control signal, receives at least part of the input data packet from the input circuitry, and outputs such to the third control circuit for determining whether such part matches one of the stored sets of information, and for setting the match signal to the first control circuit, responsive to a match, wherein the first control circuit demultiplexes the input data responsive to the match signal.

2. The receiver of claim 1 wherein responsive to the second type control signal the first control circuit demultiplexes the input data packet.

3. The receiver of claim 1 further comprising:
a further memory for storing all packet identifiers of data packets required by the receiver; and
a fourth control circuit for receiving the extracted packet identifier, and determining whether such matches one of the packet identifiers stored in the further memory, and for setting the first or second type control signal responsive to a match,
wherein the first control circuit demultiplexes the input data packet responsive to the match signal.

4. The receiver of claim 3 in which the fourth control circuit outputs the address in the further memory of the extracted packet identifier responsive to a match, and the second control circuit accesses that address to retrieve control information associated with the packet identifier.

5. The receiver of claim 4 wherein the control information is indicative of whether the data packet is of the first or second type.

6. The receiver of claim 1 in which the memory is a content addressable memory.

7. The receiver of claim 1 in which the digital data stream is an MPEG-2 encoded stream.

8. The receiver of claim 7 in which the first type of data packet is program specific information and the second type of data packet is a packetized elementary stream.

9. The receiver of claim 7 in which the first control circuit includes a transport processor, and the second control circuit includes a receiver processor.

10. A set-top-box including a receiver for demultiplexing a digital data stream, the digital data stream including at least two types of data packets each having a packet identifier indicative of the type, so as to retain only those data packets required by the receiver, the receiver comprising:
input circuitry for receiving the digital data stream;
a first control circuit for extracting a packet identifier from an input data packet in the digital data stream, and generating a first or a second type control signal in dependence on whether the input data packet is of a first or a second type;
a memory for storing sets of information associated with those first types of data packet required by the receiver;
a second control circuit for controlling the storage in the memory of the sets of information; and
a third control circuit responsive to the first type control signal in a first mode of operation for directly receiving at least part of the input data packet from the input circuitry and determining whether such part matches one of the stored sets of information, and for setting a match signal, wherein the third control circuit demultiplexes the input data packet responsive to the match signal, wherein in a second mode of operation the first control circuit, responsive to the first type control signal, receives at least part of the input data packet from the input circuitry, and outputs such to the third control circuit for determining whether such part matches one of the stored sets of information, and for setting the match signal to the first control circuit, responsive to a match, wherein the first control circuit demultiplexes the input data responsive to the match signal.

11. A method of demultiplexing a digital data stream input to a receiver, the digital data stream including at least two types of data packets each having a packet identifier, so as to retain only those data packets required by the receiver, the method comprising the steps of:
inputting the digital data stream;
extracting, under the control of a first control circuit, a packet identifier from an input data packet in the digital data stream;
generating a first or a second type control signal in dependence on whether the input data packet is of a first or a second type;
storing in a memory, under the control of a second control circuit, sets of information associated with those first types of data packet required by the receiver;
in a first mode of operation responsive to the first type control signal,
determining, under the control of a third control circuit, whether at least part of the input data packet directly received by the third control circuit from the input circuitry matches one of the stored sets of information;
setting a match signal responsive to a match determined by the third control circuit; and
demultiplexing, under the control of the third control circuit, the input data packet responsive to the match signal; and
in a second mode of operation, determining responsive to the first type control signal, under the control of the first control circuit, whether at least part of the input data packet matches the sets of information stored in the memory;
setting a match signal responsive to a match determined by the third control circuit; and
demultiplexing, under the control of the first control circuit, the input data packet responsive to the match signal.

12. The method of claim 11 further comprising the step of:
demultiplexing the input data packet under the control of the first control circuit responsive to the second type control signal.

13. The method of claim 11 further comprising the steps of:
storing in a further memory all packet identifiers of data packets required by the receiver;
determining, under the control of a fourth control circuit, whether the extracted packet identifier matches one of the stored packet identifiers;
setting either the first or second type control signal responsive to a match; and
demultiplexing, under the control of the first control circuit, the input data packet responsive to either the first or second type control signal.

14. The method of claim 13 further comprising the steps of:
outputting, responsive to one of the first or second type control signals, the address in memory of the extracted packet identifier;
accessing, under the control of the first control circuit the address in memory; and
retrieving control information associated with a packet identifier and stored at such address.

15. The method of claim 11 in which the digital data stream is an MPEG-2 encoded stream.

16. The method of claim 15 in which the first type of data packet is program specific information and the second type of data packet is a packetized elementary stream.

17. A receiver for demultiplexing a digital data stream, the digital data stream including at least two types of data packets each having a packet identifier indicative of the type, so as to retain only those data packets required by the receiver, the receiver comprising:
  input circuitry for receiving the digital data stream;
  a first control circuit for extracting a packet identifier from an input data packet in the digital data stream, and generating a first or a second type control signal in dependence on whether the input data packet is of a first or a second type;
  a memory for storing sets of information associated with those first types of data packet required by the receiver;
  a second control circuit for controlling the storage in the memory of the sets of information; and
  a third control circuit responsive to the first type control signal in a first mode of operation for directly receiving at least part of the input data packet from the input circuitry and determining whether such part matches one of the stored sets of information, and for setting a match signal, wherein the third control circuit demultiplexes the input data packet responsive to the match signal, wherein
  responsive to the second type control signal the first control circuit demultiplexes the input data packet.

18. A method of demultiplexing a digital data stream input to a receiver, the digital data stream including at least two types of data packets each having a packet identifier, so as to retain only those data packets required by the receiver, the method comprising the steps of:
  inputting the digital data stream;
  extracting, under the control of a first control circuit, a packet identifier from an input data packet in the digital data stream;
  generating a first or a second type control signal in dependence on whether the input data packet is of a first or a second type;
  storing in a memory, under the control of a second control circuit, sets of information associated with those first types of data packet required by the receiver;
  in a first mode of operation responsive to the first type control signal determining, under the control of a third control circuit, whether at least part of the input data packet received by the third control circuit directly from the input circuitry matches one of the stored sets of information;
  setting a match signal responsive to a match determined by the third control circuit; and
  demultiplexing, under the control of the third control circuit, the input data packet responsive to the match signal, and in a further mode of operation
  demultiplexing the input data packet under the control of the first control circuit responsive to the second type control signal.

19. A receiver for demultiplexing a digital data stream, the digital data stream including at least two types of data packets each having a packet identifier indicative of the type, so as to retain only those data packets required by the receiver, the receiver comprising:
  input circuitry for receiving the digital data stream;
  a first control circuit for extracting a packet identifier from an input data packet in the digital data stream, and generating a first or a second type control signal in dependence on whether the input data packet is of a first or a second type;
  a memory for storing sets of information associated with those first types of data packet required by the receiver;
  a second control circuit for controlling the storage in the memory of the sets of information;
  a third control circuit responsive to the first type control signal in a first mode of operation for receiving at least part of the input data packet from the input circuitry and determining whether such part matches one of the stored sets of information, and for setting a match signal, wherein the third control circuit demultiplexes the input data packet responsive to the match signal without storing the input data packet in a separate memory, wherein in a second mode of operation the first control circuit, responsive to the first type control signal, receives at least part of the input data packet from the input circuitry, and outputs such to the third control circuit for determining whether such part matches one of the stored sets of information, and for setting the match signal to the first control circuit, responsive to a match, wherein the first control circuit demultiplexes the input data responsive to the match signal.

20. The receiver of claim 19 wherein responsive to the second type control signal the first control circuit demultiplexes the input data packet.

21. The receiver of claim 19 further comprising:
  a further memory for storing all packet identifiers of data packets required by the receiver; and
  a fourth control circuit for receiving the extracted packet identifier, and determining whether such matches one of the packet identifiers stored in the further memory, and for setting the first or second type control signal responsive to a match,
  wherein the first control circuit demultiplexes the input data packet responsive to the match signal.

22. The receiver of claim 21 in which the fourth control circuit outputs the address in the further memory of the extracted packet identifier responsive to a match, and the second control circuit accesses that address to retrieve control information associated with the packet identifier.

23. The receiver of claim 22 wherein the control information is indicative of whether the data packet is of the first or second type.

24. The receiver of claim 19 in which the memory is a content addressable memory.

25. The receiver of claim 19 in which the digital data stream is an MPEG-2 encoded stream.

26. The receiver of claim 25 in which the first type of data packet is program specific information and the second type of data packet is a packetized elementary stream.

27. The receiver of claim 25 in which the first control circuit includes a transport processor, and the second control circuit includes a receiver processor.

28. A set-top-box including a receiver for demultiplexing a digital data stream, the digital data stream including at least two types of data packets each having a packet identifier indicative of the type, so as to retain only those data packets required by the receiver, the receiver comprising:
  input circuitry for receiving the digital data stream;
  a first control circuit for extracting a packet identifier from an input data packet in the digital data stream, and generating a first or a second type control signal in dependence on whether the input data packet is of a first or a second type;

a memory for storing sets of information associated with those first types of data packet required by the receiver;
a second control circuit for controlling the storage in the memory of the sets of information; and
a third control circuit responsive to the first type control signal in a first mode of operation for receiving at least part of the input data packet from the input circuitry, and determining whether such part matches one of the stored sets of information, and for setting a match signal, wherein the third control circuit demultiplexes the input data packet responsive to the match signal without storing the input data packet in a separate memory, wherein in a second mode of operation the first control circuit, responsive to the first type control signal, receives at least part of the input data packet from the input circuitry, and outputs such to the third control circuit for determining whether such part matches one of the stored sets of information, and for setting the match signal to the first control circuit, responsive to a match, wherein the first control circuit demultiplexes the input data responsive to the match signal.

29. A method of demultiplexing a digital data stream input to a receiver, the digital data stream including at least two types of data packets each having a packet identifier, so as to retain only those data packets required by the receiver, the method comprising the steps of:
inputting the digital data stream;
extracting, under the control of a first control circuit, a packet identifier from an input data packet in the digital data stream;
generating a first or a second type control signal in dependence on whether the input data packet is of a first or a second type;
storing in a memory, under the control of a second control circuit, sets of information associated with those first types of data packet required by the receiver;
in a first mode of operation responsive to the first type control signal,
determining, under the control of a third control circuit, whether at least part of the input data packet received by the third control circuit from the input circuitry, matches one of the stored sets of information;
setting a match signal responsive to a match determined by the third control circuit; and
demultiplexing, under the control of the third control circuit and without intermediate storage in a memory, the input data packet responsive to the match signal; and
in a second mode of operation,
determining responsive to the first type control signal, under the control of the first control circuit, whether at least part of the input data packet matches the sets of information stored in the memory;
setting a match signal responsive to a match determined by the third control circuit; and
demultiplexing, under the control of the first control circuit, the input data packet responsive to the match signal.

30. The method of claim 29 further comprising the step of:
demultiplexing the input data packet under the control of the first control circuit responsive to the second type control signal.

31. The method of claim 29 further comprising the steps of:
storing in a further memory all packet identifiers of data packets required by the receiver;
determining, under the control of a fourth control circuit, whether the extracted packet identifier matches one of the stored packet identifiers;
setting either the first or second type control signal responsive to a match; and
demultiplexing, under the control of the first control circuit, the input data packet responsive to either the first or second type control signal.

32. The method of claim 31 further comprising the steps of:
outputting, responsive to one of the first or second type control signals, the address in memory of the extracted packet identifier;
accessing, under the control of the first control circuit the address in memory; and
retrieving control information associated with a packet identifier and stored at such address.

33. The method of claim 29 in which the digital data stream is an MPEG-2 encoded stream.

34. The method of claim 33 in which the first type of data packet is program specific information and the second type of data packet is a packetized elementary stream.

35. A receiver for demultiplexing a digital data stream, the digital data stream including at least two types of data packets each having a packet identifier indicative of the type, so as to retain only those data packets required by the receiver, the receiver comprising:
input circuitry for receiving the digital data stream;
a first control circuit for extracting a packet identifier from an input data packet in the digital data stream, and generating a first or a second type control signal in dependence on whether the input data packet is of a first or a second type;
a memory for storing sets of information associated with those first types of data packet required by the receiver;
a second control circuit for controlling the storage in the memory of the sets of information; and
a third control circuit responsive to the first type control signal in a first mode of operation for receiving at least part of the input data packet from the input circuitry and determining whether such part matches one of the stored sets of information, and for setting a match signal, wherein the third control circuit demultiplexes the input data packet responsive to the match signal without intermediate storage of the data packet in a memory, wherein
in a second mode of operation the first control circuit, responsive to the first type control signal, receives at least part of the input data packet from the input circuitry, and outputs such to the third control circuit for determining whether such part matches one of the stored sets of information, and for setting the match signal to the first control circuit responsive to a match, wherein the first control circuit demultiplexes the input data responsive to the match signal.

36. A receiver for demultiplexing a digital data stream, the digital data stream including at least two types of data packets each having a packet identifier indicative of the type, so as to retain only those data packets required by the receiver, the receiver comprising:
input circuitry for receiving the digital data stream;
a first control circuit for extracting a packet identifier from an input data packet in the digital data stream, and generating a first or a second type control signal in dependence on whether the input data packet is of a first or a second type;

a memory for storing sets of information associated with those first types of data packet required by the receiver;

a second control circuit for controlling the storage in the memory of the sets of information; and a third control circuit responsive to the first type control signal in a first mode of operation for receiving at least part of the input data packet from the input circuitry and determining whether such part matches one of the stored sets of information, and for setting a match signal, wherein the third control circuit demultiplexes the input data packet responsive to the match signal without intermediate storage of the input data packet in a memory, wherein responsive to the second type control signal the first control circuit demultiplexes the input data packet.

37. A method of demultiplexing a digital data stream input to a receiver, the digital data stream including at least two types of data packets each having a packet identifier, so as to retain only those data packets required by the receiver, the method comprising the steps of:

inputting the digital data stream;

extracting, under the control of a first control circuit, a packet identifier from an input data packet in the digital data stream;

generating a first or a second type control signal in dependence on whether the input data packet is of a first or a second type;

storing in a memory, under the control of a second control circuit, sets of information associated with those first types of data packet required by the receiver;

in a first mode of operation responsive to the first type control signal determining, under the control of a third control circuit, whether at least part of the input data packet received by the third control circuit from the input circuitry matches one of the stored sets of information;

setting a match signal responsive to a match determined by the third control circuit; and demultiplexing, under the control of the third control circuit and without intermediate storage in a memory, the input data packet responsive to the match signal, and in a second mode of operation determining responsive to the first type control signal, under the control of the first control circuit, whether at least part of the input data packet matches the sets of information stored in the memory;

setting a match signal responsive to a match determined by the third control circuit; and demultiplexing, under the control of the first control circuit, the input data packet responsive to the match signal.

38. A method of demultiplexing a digital data stream input to a receiver, the digital data stream including at least two types of data packets each having a packet identifier, so as to retain only those data packets required by the receiver, the method comprising the steps of:

inputting the digital data stream;

extracting, under the control of a first control circuit, a packet identifier from an input data packet in the digital data stream;

generating a first or a second type control signal in dependence on whether the input data packet is of a first or a second type;

storing in a memory, under the control of a second control circuit, sets of information associated with those first types of data packet required by the receiver;

in a first mode of operation responsive to the first type control signal determining, under the control of a third control circuit, whether at least part of the input data packet received by the third control circuit from the input circuitry matches one of the stored sets of information;

setting a match signal responsive to a match determined by the third control circuit; and demultiplexing, under the control of the third control circuit and without intermediate storage in a memory, the input data packet responsive to the match signal, and in a further mode of operation demultiplexing the input data packet under the control of the first control circuit responsive to the second type control signal.

39. A receiver, comprising:

an input module configured to receive a digital data stream including at least two types of data packets, each type having a packet identifier indicative of the type;

a transport controller configured to extract the packet identifier from an input data packet in the digital data stream and to determine a type of the input data packet;

a memory configured to store sets of information associated with data packets of a first type of input data packet;

a memory controller configured to control storage in the memory of the sets of information; and a section filter configured to selectively determine whether a portion of the input data packet matches one of the stored sets of information, wherein, in a first mode of operation, the section filter is configured to receive the portion of the input data packet from the input module and to respond to a match by demultiplexing the input data packet when the input data packet is of the first type; and in a second mode of operation, the section filter is configured to receive the portion of the input data packet from the transport controller and the transport controller is configured to respond to a match by demultiplexing the input data circuit when the input data packet is of the first type.

40. The receiver of claim 39 wherein the transport controller is configured to demultiplex the input data packet when the input data packet is of a second type.

41. The receiver of claim 39 wherein in a third mode of operation the transport controller is configured to process the input data packet independent of the section filter.

* * * * *

UNITED STATES PATENT AND TRADEMARK OFFICE
CERTIFICATE OF CORRECTION

PATENT NO. : 7,248,602 B2  Page 1 of 1
APPLICATION NO. : 10/421317
DATED : July 24, 2007
INVENTOR(S) : William Robbins et al.

It is certified that error appears in the above-identified patent and that said Letters Patent is hereby corrected as shown below:

Title Page
(30) Foreign Application Priority Data
"Apr. 30, 1998" should read as -- Jan. 30, 1998 --

Signed and Sealed this

Twelfth Day of August, 2008

JON W. DUDAS
*Director of the United States Patent and Trademark Office*